APPARATUS FOR TRANSMITTING SIGNALS BY MODULATED OSCILLATIONS OF CONSTANT AMPLITUDE

Filed June 6, 1962

INVENTOR
*JOHANNES A. GREEFKES*
BY
Frank R. Trifari
AGENT 3,238,456

APPARATUS FOR TRANSMITTING SIGNALS BY MODULATED OSCILLATIONS OF CONSTANT AMPLITUDE

Johannes Anton Greefkes, Emmasingel, Eindhoven, Netherlands, assignor to North American Philips Company, Inc., New York, N.Y., a corporation of Delaware Filed June 6, 1962, Ser. No. 200,570
Claims priority, application Netherlands, July 20, 1961, 267,337
6 Claims. (Cl. 325—46)

The invention relates to a transmission apparatus for the transmission of signals by modulated oscillations of constant amplitude, for example, by frequency modulation, pulse code modulation, pulse position modulation and the like. The transmission apparatus comprises a dynamic control-member. The apparatus according to the invention may be advantageously employed both for speech transmission and for music transmission.

With known dynamic control-devices the signals to be transmitted are applied to a variable attenuator having an attenuation degree of which varies within wide limits in dependence upon the dynamic control-voltage. In order to obtain a linear, distortion-free dynamic control throughout the dynamic control range, special attention must be given to the structure of the variable attenuator. This control can be realized only with difficulty, particularly when employing a wide dynamic control-range of, for example, 50 db.

The invention has for its object to provide, in apparatus of the kind set forth, a different concept of a dynamic control arrangement, in which a linear dynamic control is obtained throughout the dynamic control-range, and, in addition, distortion is drastically reduced.

The apparatus according to the invention is characterized in that at the input circuit of the dynamic control member the modulated oscillations of constant amplitude are applied to a demodulation member followed by a dynamic voltage rectifier with the associated low bandpass filter, and the oscillations are also applied to an amplitude modulator, which is controlled by the output voltage of the dynamic voltage rectifier. The dynamic control member also comprises a demodulation member, connected to the output circuit of the amplitude modulator and supplying the output voltage of the dynamic control member.

Figure 1:
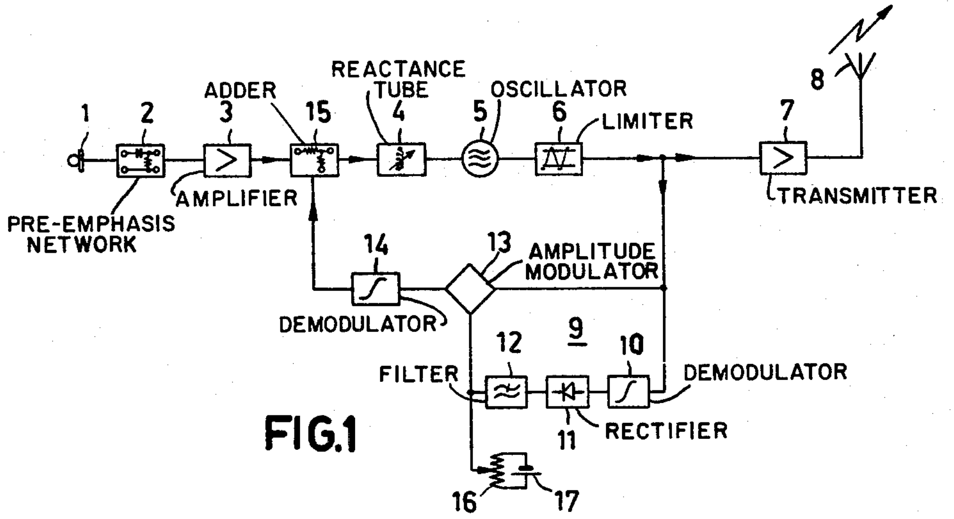
Figure 2:
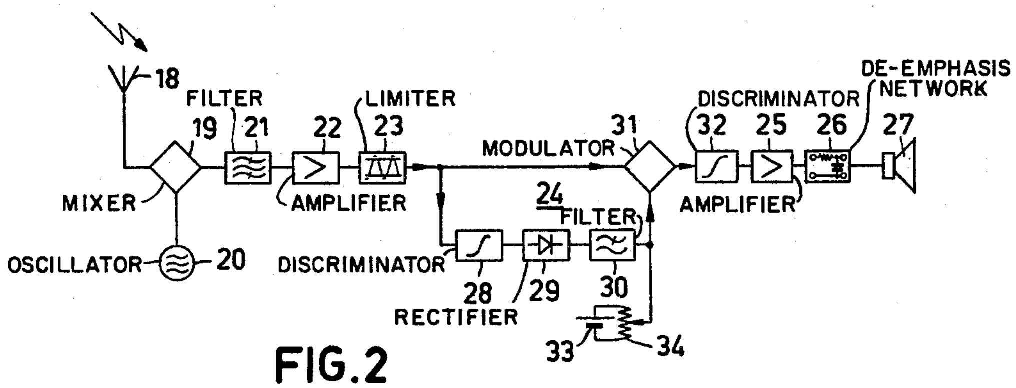

The invention and its advantages will now be described more fully with reference to the figures, in which:

FIG. 1 is a block diagram of a transmitting device for frequency-modulated oscillations according to the invention; and FIG. 2 is a block diagram of the receiving device for frequency-modulated oscillations according to the invention.

The transmitting device according to the invention, shown in FIG. 1, is suitable for the transmission of speech signals by means of frequency-modulated oscillations; these speech signals may lie, for example, in the frequency range from 300 to 3400 c./s.

The speech signals emanating from a microphone 1 are applied by way of a pre-emphasis network 2 to a speech-signal amplifier 3. The amplified speech signals control a frequency modulator formed by a reactance tube 4, connected to an oscillator 5. The oscillations from the oscillator, having for example a frequency of 30 mc./s., are frequency-modulated by the speech signals with a sweep of 75 kc./s. Frequency-modulated oscillations occurring at the output of the oscillator 5 are applied, subsequent to limitation in a limiting stage 6, to a transmitting stage 7. The transmitter 7 comprises a transmitter amplifier and, if desired, a frequency transposition stage, after which the oscillations are transmitted by way of the transmitting antenna 8.

The input circuit of a dynamic compression member 9 is connected to the output circuit of the limiting stage 6 for dynamic compression. The frequency-modulated oscillations are applied to a demodulator 10, followed by a dynamic control-voltage rectifier 11 with the associated low bandpass filter 12. The modulated oscillations are also applied to an amplitude modulator 13, which is controlled by the output voltage of the dynamic control voltage rectifier 11, 12. The dynamic control voltage rectifier 11, 12 may have a building-up time constant of 2 msecs. and a decay time constant of 30 msecs. The dynamic control member 9 also comprises a demodulation member 14, connected to the output circuit of the amplitude modulator 13. The output voltage of the dynamic control member 9, supplied by the demodulation member 14 is added, for dynamic compression, as a negative feedback voltage in an adder 15 to the speech signals from the microphone 1. It is advantageous to construct the amplitude modulator 13 as a push-pull modulator, for example in the form of a ring modulator while the demodulation member 10, 14 may be a frequency discriminator of the Foster-Seeley type.

In the apparatus shown the dynamic control member 9 constitutes a negative feedback circuit between the input and the output of the frequency-modulation system 4, 5 in which the dynamic compression is brought about by the variation of the negative feedback factor with the level of the microphone signals, which will be explained more fully hereinafter.

A level variation of the microphone signals produces at the output of the frequency discriminator 10, connected to the frequency-modulation system 4, 5, a level variation of the output voltage thereof and hence also produces a variation of the dynamic control-voltage. This variation in the subsequent dynamic control-voltage rectifier 11, 12, amplitude modulates the frequency-modulated oscillations fed with constant amplitude to the amplitude modulator 13, and the output of modulator 13 is applied to the input of the frequency discriminator 14. The input signals of the frequency discriminator 14 thus vary in frequency and amplitude with the level of the microphone signals, so that the output voltage of the frequency discriminator 14 will vary both with the frequency modulation and with the amplitude modulation of the signals applied thereto. If, for example, the output level of the frequency discriminator 14 varies in response to the frequency modulation by a factor $\beta$, the amplitude modulation brings about an additional level variation of a factor $\beta$, so that the output level of the frequency discriminator 14 will change by a factor $\beta^2$.

On the other hand the output voltage of the frequency discriminator 14, included in the negative feedback loop formed by the frequency modulator 4, 5, the dynamic control member 9 and the low-frequency transmitter part, is compelled to follow the level variations of the microphone signals. If for example the level of the microphone signals varies by a factor $\alpha$, the output level of the frequency discriminator 14, connected to the low-frequency transmitter part, will also vary by a factor $\alpha$, in the case of an adequate negative feedback. Then the level variation of the microphone signals by a factor $\alpha$ will cause the level of the frequency discriminator 10, connected to the output circuit of the frequency modulator 4, 5 to vary only by a factor $\beta=\sqrt{\alpha}$, which means a compression ratio ½ of the level variation measured in decibels. It is thus rendered possible with lower input signals to obtain a more favourable modulation percentage, which is particularly advantageous for the signal-to-noise ratio at the receiver end.

If desired, a different compression ratio may be obtained in a simple manner by feeding to the amplitude modulator 13 not only the dynamic control-voltage but also a direct voltage, which may be obtained via an adjustable potentiometer 16 from a direct-voltage source 17.

As stated above, the dynamic compression is brought about in the apparatus so far described by modulating in the amplitude modulator 13 the transmitted, frequency-modulated oscillations of constant amplitude by means of the dynamic control-voltage from the dynamic control-voltage rectifier 11, 12 and by feeding these frequency- and amplitude-modulated oscillations, subsequent to demodulation in the frequency discriminator 14, as a negative feedback voltage via the adding member 15 to the low-frequency transmitter part. In the apparatus described, in which the dynamic compression is obtained by linear modulation and demodulation processes, a linear distortion-free compression is obtained throughout the compression control-range, whilst the distortion level of the emitted signals is at the same time minimized, since the dynamic control-member 9, connected between the input and the output of the frequency modulator 4, 5 constitutes a negative feedback circuit for the frequency modulator 4, 5 with a negative feedback factor increasing with an increasing signal level, so that the distortion level, which becomes particularly manifest with an increasing signal level, is effectively suppressed.

Moreover, the dynamic control-member 9 described above for the frequency-modulation transmitter described operates as a stabilizing circuit of the transmitter frequency. The dynamic control-member 9 furnishes, in the case of a deviation of the transmitter frequency from the tuning frequency of the frequency discriminators 10, 14 a direct control-voltage which brings about a stabilisation of the transmitter frequency via the frequency corrector 4, coupled with the oscillator 5. The stabilisation obtained for the transmitter frequency is in this case particularly effective, since as stated above, the output voltage of the dynamic control-member 9 is proportional to the square of the output voltage of a frequency discriminator 10, connected to the output of the frequency modulator 4, 5, so that this output voltage is proportional to the square of the deviation of the transmitter frequency from the tuning frequency of the frequency discriminators 17, 14.

In the dynamic control-member described not only a linear compression throughout the compression range but also a minimum distortion level and an effective stabilisation of the transmitter frequency are thus obtained, so that the use of this member is in practice particularly desirable.

FIG. 2 shows a receiver co-operating with the transmitter described with reference to FIG. 1 in accordance with the invention.

In the device shown the frequency modulated oscillations received by an antenna 18 are transposed in a mixer 19 connected to an oscillator 20. The output of the mixer is applied by way of intermediate-frequency filter 21, having an intermediate frequency, for example 500 kc./s., to an intermediate-frequency amplifier 22, and thence to a limiter 21. A dynamic expansion member 24 is connected to the output of the limiter, and the signals expanded in this member are applied by way of a low-frequency amplifier 25 and a de-emphasis network 26, to a loudspeaker 27.

In the receiver described a forward control for dynamic expansion is used instead of a backward control for dynamic compression as in the transmitter of FIG. 1, but otherwise the dynamic control member 24 used for dynamic expansion is identical to the dynamic control member 9 described with reference to FIG. 1. The frequency-modulated oscillations derived from the limiter 23 are applied to a frequency discriminator 28, followed by a dynamic control-voltage rectifier 29 with the associated low bandpass filter 30 and also to an amplitude modulator 31, which is controlled by the output voltage of the dynamic control-voltage rectifier 29, 30. The dynamic control member comprises a frequency discriminator 32, connected to the output circuit of the amplitude modulator 31 and furnishing the output voltage of the dynamic expansion member.

If in this device the output level of the frequency discriminator 28, connected to the limiter 23, varies by a factor $\beta$, the level of the output voltage of the frequency discriminator 32 will vary by a factor $\beta^2$, as described with reference to FIG. 1, owing to the dynamic control member 24, so that an expansion ratio 2 of the level variations measured in decibels is obtained. Speech signals occurring across the output circuits of the dynamic expansion member 24 are fed by way of the low-frequency amplifier 25 and a de-emphasis network 26 to the reproducing member 27. Due to the linear modulation and demodulation processes a linear, distortion-free expansion is obtained, which may be employed advantageously for obtaining very high reproduction qualities.

In the apparatus described above it is also possible to obtain a different expansion ratio by supplying to the input of the amplitude modulator 31 a direct voltage from a direct-voltage source 33, which voltage is fed via a potentiometer 34 to the input of the amplitude modulator 31.

The dynamic control system described may also be used advantageously with other types of modulation, provided that a modulation method is employed in which the amplitude of the emitted oscillations is constant.

What is claimed is:

1. A transmission system for transmitting and receiving dynamically controlled oscillations comprising a transmitter and a receiver, said transmitter comprising a source of signals, a source of oscillations, first modulating means for modulating said oscillations by said signals to provide modulated oscillations of constant amplitude, means for transmitting said modulated oscillations, and dynamic control means comprising first demodulating means for demodulating said modulated oscillations, first rectifier means for rectifying the output of said first demodulating means, first amplitude modulating means for amplitude modulating said modulated oscillations with the output of said first rectifier means, second demodulating means for demodulating the output of said first amplitude modulating means, and means for negatively adding the output of said second demodulating means to said signals before they are applied to said modulating means, said receiver comprising means for receiving said modulated osclla-tions, third demodulating means for demodulating said modulated oscillation, second rectifier means for rectifying the output of said third demodulating means, second amplitude modulating means for modulating said modulated oscillations with the output of said second rectifier means, and foruth demodulating means for demodulating the output of said second amplitude modulating means.

2. A transmitting system comprising a source of signals, a source of oscillations, means for modulating said lations have constant amplitude, means for transmitting oscillations by said signals whereby the modulated oscil-said modulated oscillations, and dynamic control means comprising first demodulating means, means applying said modulated oscillations to said first demodulating means, dynamic voltage rectifier means connected to the output of said first demodulating means, amplitude modulating means, means for applying said modulated oscillations to said amplitude modulating means, means connecting the output of said rectifier means to said amplitude modulating means to amplitude modulate said modulated oscillations, second demodulating means connected to the output of said amplitude modulator, and means for negatively adding the output of said second demodulating means to said signals before they are applied to said modulating means.

3. The system of claim 2, comprising a source of direct voltage, and means for applying said direct voltage to said amplitude modulating means for varying the compression ratio of said dynamic control means.

4. The system of claim 2, in which said rectifier means has a building up time constant of 2 milliseconds and a decay time constant of 30 milliseconds.

5. A receiver for dynamically controlled modulated oscillations of the type that are modulated with constant amplitude, comprising first demodulating means for demodulating said oscillations, rectifier means for rectifying the output of said first demodulating means, low-pass filter means connected to the output of said rectifier means, amplitude modulating means for amplitude modulating said oscillations with the output of said filter means, second demodulating means for demodulating the output of said amplitude modulator means, reproducing means, and means connecting said reproducing means to the output of said second demodulating means.

6. Means for providing a dynamic control voltage for controlling modulated oscillations of the type having a constant amplitude, comprising a source of said modulated oscillations, first demodulator means for demodulating said oscillations, rectifier means connected to the output of said first demodulating means, low-pass filter means connected to the output of said rectifier means, amplitude modulating means for amplitude modulating said modulated oscillations with the output of said filter means, and second demodulating means connected to the output of said amplitude modulating means for providing said control voltage.

References Cited by the Examiner

UNITED STATES PATENTS

| | | | |
|---|---|---|---|
| 1,999,176 | 4/1935 | Albersheim | 325—147 |
| 2,095,327 | 10/1937 | Hansell | 332—18 |
| 3,024,312 | 3/1962 | Daguet | 325—137 |

DAVID G. REDINBAUGH, *Primary Examiner.*